Jan. 8, 1929.
T. J. O'MEARA
1,698,447
RAILWAY CAR RETARDER
Filed Oct. 13, 1926
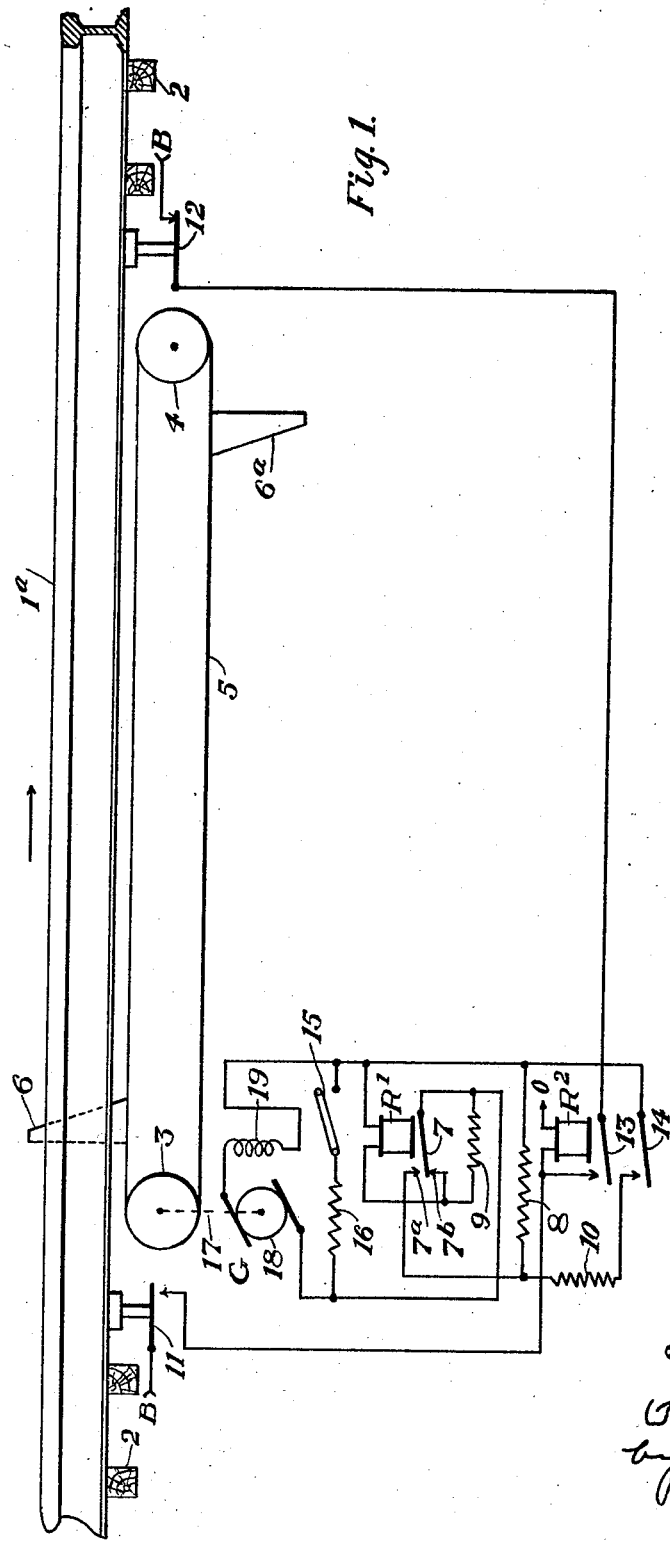
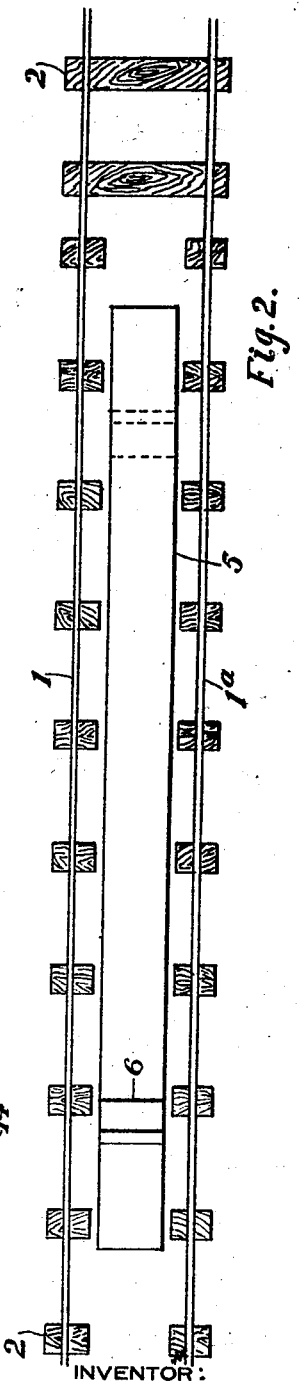
INVENTOR:
T. J. O'Meara,
by A. R. Verrill
His Attorney Patented Jan. 8, 1929.

1,698,447

UNITED STATES PATENT OFFICE.

THOMAS J. O'MEARA, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-CAR RETARDER.

Application filed October 13, 1926. Serial No. 141,354.

My invention relates to railway car retarders, that is, to devices located in the trackway for co-operation with cars to retard the progress thereof along the track. One feature of my invention is the provision of means operated by a car for driving an electric generator located in the trackway and retarding the motion of the car by the dynamic braking force exerted by said generator on the car.

I will describe one form of apparatus embodying my invention, and will then point out the novel features thereof in claims.

In the accompanying drawing, Fig. 1 is a view, partly in side elevation and partly diagrammatic, showing one form of apparatus embodying my invention. Fig. 2 is a plan view of a portion of the apparatus shown in Fig. 1.

Similar reference characters refer to similar parts in each of the views.

Referring to the drawing, the reference characters 1 and $1^a$ designate the track rails of a railway track along which cars move in the direction indicated by the arrow. Located beneath this track and preferably between the two track rails thereof are two rollers 3 and 4 the axes of which are disposed at right angles to the lines of the track rails. These rollers carry an endless belt 5, which is provided with at least two upstanding lugs 6 and $6^a$ arranged to engage a part of a railway car, such, for example, as the coupler. These lugs are disposed at opposite points on the belt 5 so that when they are in the positions shown in the drawing a car moving toward the right will engage the lug 6 and will drive the belt 5 until the car passes the roller 4, whereupon the belt 5 will continue to move due to the inertia of the moving parts until the lug 6 occupies the position in which the lug $6^a$ is shown in the drawing. The lug $6^a$ will then occupy the position in which lug 6 is shown in the drawing.

Located in the trackway is an electric generator G, which is operatively connected with the roller 3 through mechanism 17 which preferably includes multiplying gearing so that the speed of the generator G will be high with relation to the speed of the roller 3 while this roller is being rotated by a car. The generator G is provided with a circuit which passes from armature 18 through back contact $7-7^b$ of relay $R^1$ and the winding of this relay to field winding 19 of the generator. The resistance of relay $R^1$ is high, so that when back contact $7-7^b$ is closed the generator is substantially on open circuit and offers little or no dynamic resistance to the movement of belt 5. When the speed of the generator G reaches a certain value, however, so that the output voltage is above a given value, relay $R^1$ will close its front contact $7-7^a$, whereupon the output circuit of generator G will then pass from armature 18, through front contact $7-7^a$ of relay $R^1$ and resistance 8 to the field winding 19. The resistance of the element 8 is considerably less than that of the relay $R^1$, so that the generator G then offers considerable resistance to the movement of belt 5. If the speed of the car is then reduced below a certain value the generator voltage will decrease and so will permit relay $R^1$ to open, the releasing point of this relay being determined by a resistance 9 which is introduced into the generator circuit in series with relay $R^1$ when the back contact $7-7^b$ of this relay becomes opened.

Located adjacent the roller 3 is a normally open contact 11 which is attached to one of the track rails and becomes closed when a car weighing more than a given amount approaches the retarder. Located adjacent the roller 4 is a second contact 12 which is normally closed but becomes opened when a car leaves the retarder. These contacts control a relay $R^2$ in the following manner: Relay $R^2$ is provided with a pick-up circuit which passes from terminal B of a suitable source of current through contact 11 and the winding of relay $R^2$ to terminal O of the same source of current. Relay $R^2$ is provided with a stick or holding circuit which passes from terminal B through contact 12, contact 13 of relay $R^2$ and the winding of relay $R^2$ to terminal O. It will be seen, therefore, that when a car weighing more than a given amount approaches the retarder, relay $R^2$ will become closed and will remain closed until the car leaves the retarder. When relay $R^2$ is closed, and relay $R^1$ is also closed, a resistance 10 is included in the output circuit of the generator G in multiple with resistance 8, because the branch circuit for resistance 10 includes front contact 14 of relay $R^2$. This reduces the total resistance of the output circuit for generator G, so that this generator exerts a still greater braking effect on the roller 3 and so on the belt 5.

If desired, a fourth resistance 16 may be introduced into the output circuit of generator G through the medium of a normally open manually operable contact 15.

The operation of the apparatus is as follows: First assuming that a relatively light car approaches the retarder, contact 11 will remain open, so that relay $R^2$ will remain open and resistance 10 will not be included in the output circuit of generator G. The car will engage the lug 6 and so will drive the belt 5 at the same speed as that of the car. If this speed is below a critical value, relay $R^1$ will remain open so that the generator G will have substantially no braking effect on the belt 5 and the retarder will, therefore, have no effect on the car other than that due to the friction of the moving parts. If, however, the speed of the car is higher than the critical value, relay $R^1$ will become closed, thereby introducing resistance 8 into the circuit for generator G so that this generator will have a substantial braking effect on the belt 5 and thus will reduce the speed of the car. If the car is relatively heavy it will close contact 11 before entering the retarder, and so it will cause relay $R^2$ to become closed. If the speed of the car is below the critical value, relay $R^2$ will have no effect because the resistances 8 and 10 are excluded from the generator circuit due to the fact that relay $R^1$ is open. If, however, the speed is above the critical value, relay $R^1$ will close and the resistance of the generator circuit will then be less than when the relatively light car is passing through the retarder and so the braking effect on the relatively heavy car will be greater than on the relatively light car. When the relatively heavy car leaves the retarder, it will open contact 12 so that relay $R^2$ will again become de-energized. Contact 15 may be closed at any time by an operator to increase the braking effect beyond that due to resistance 8 alone or resistances 8 and 10 in multiple.

Although I have herein shown and described only one form of apparatus embodying my invention, it is understood that various changes and modifications may be made therein within the scope of the appended claims without departing from the spirit and scope of my invention.

Having thus described my invention, what I claim is:

1. Railway car retarding apparatus comprising an electric generator located in the trackway, and means including a member engaging a car moving along the trackway for operating said generator, and means for varying the resistance of the output circuit for said generator.

2. Railway car retarding apparatus comprising an electric generator located in the trackway, and means including a member engaging a car moving along the trackway for operating said generator, and means for varying the resistance of the output circuit for said generator in response to variation in the voltage of the generator.

3. Railway car retarding apparatus comprising an electric generator located in the trackway, and means including a member engaging a car moving along the trackway for operating said generator, and manual means for varying the resistance of the output circuit of said generator.

4. Railway car retarding apparatus comprising an electric generator located in the trackway, and means including a member engaging a car moving along the trackway for operating said generator, an output circuit for said generator including the winding of a relay, and means controlled by said relay for varying the resistance of said output circuit.

5. Railway car retarding apparatus comprising an electric generator located in the trackway, and means including a member engaging a car moving along the trackway for operating said generator, and means responsive to the weight of the car for varying the resistance of the output circuit of said generator.

6. Railway car retarding apparatus comprising an electric generator located in the trackway, and means including a member engaging a car moving along the trackway for operating said generator, a normally open contact closed when a car of more than a given weight approaches said operating means, a normally closed contact opened when a car leaves said operating means, a relay having a pick-up circuit including said normally open contact and a holding circuit including said normally closed contact, and means controlled by said relay for varying the resistance of the output circuit of said generator.

7. Railway car retarding apparatus comprising an electric generator located in the trackway, and means including a member engaging a car moving along the trackway for operating said generator, a normally open contact closed when a car of more than a given weight approaches said operating means, a normally closed contact opened when a car leaves said operating means, a relay having a pick-up circuit including said normally open contact and a holding circuit including said normally closed contact, and means controlled jointly by said relay and by variations in the output voltage of said generator for varying the resistance of the output circuit of the generator.

8. Railway car retarding apparatus comprising an electric generator located in the trackway, and means including a member engaging a car moving along the trackway for operating said generator, a normally open contact closed when a car of more than a given weight approaches said operating means, a normally closed contact opened when a car leaves said operating means, a relay having a pick-up circuit including said normally open contact and a holding circuit including said normally closed contact, an output circuit for said generator including a second relay, and means controlled jointly by said two relays for varying the resistance of said output circuit.

9. Railway car retarding apparatus comprising, means movable longitudinally along the track and having a projecting part engageable by a car moving on said track, an electric generator having its shaft operatively connected to said means to retard said car, and means for automatically varying the retardation imposed by said generator dependent upon the weight of said car.

10. Railway car apparatus comprising, means movable longitudinally along the track and having a projecting part engageable by a car moving on said track, an electric generator having its shaft operatively connected to said means to retard said car, and means for automatically varying the retardation imposed by said generator dependent upon the speed and weight of said car.

In testimony whereof I affix my signature.

THOMAS J. O'MEARA.